(12) United States Patent
Thulasiraman et al.

(10) Patent No.: US 9,459,834 B2
(45) Date of Patent: Oct. 4, 2016

(54) TRUE RANDOM NUMBER GENERATOR USING GPU AND SIGNAL PROCESSING TECHNIQUES

(76) Inventors: Parimala Thulasiraman, Winnipeg (CA); Ruppa K. Thulasiram, Winnipeg (CA); Jose Juan Mijares Chan, Winnipeg (CA); Bhanu Sharma, Winnipeg (CA); Jiaqing Lv, Winnipeg (CA); Gabriel Thomas, Winnipeg (CA)

(*) Notice: Subject to any disclaimer, the term of this patent is extended or adjusted under 35 U.S.C. 154(b) by 528 days.

(21) Appl. No.: 13/977,066

(22) PCT Filed: Feb. 8, 2012

(86) PCT No.: PCT/CA2012/050069
§ 371 (c)(1),
(2), (4) Date: Oct. 1, 2013

(87) PCT Pub. No.: WO2012/106819
PCT Pub. Date: Aug. 16, 2012

(65) Prior Publication Data
US 2014/0304316 A1 Oct. 9, 2014

Related U.S. Application Data

(60) Provisional application No. 61/440,492, filed on Feb. 8, 2011.

(51) Int. Cl.
G06F 7/58 (2006.01)

(52) U.S. Cl.
CPC .................... *G06F 7/588* (2013.01)

(58) Field of Classification Search
CPC ....................................... G06F 7/588
See application file for complete search history.

(56) References Cited

U.S. PATENT DOCUMENTS

| | | | |
|---|---|---|---|
| 4,541,115 A | 9/1985 | Werth | |
| 5,581,371 A | 12/1996 | Spaulding et al. | |
| 2009/0199018 A1 | 8/2009 | Lang et al. | |
| 2009/0262928 A1* | 10/2009 | Busari ................ | G06F 7/588 380/46 |

OTHER PUBLICATIONS

Coltuc, Dinu et al, Exact Histogram Specification, May 2006, IEEE Transactions on Image Processing, vol. 15, No. 5, pp. 1143-1152.*
Pang et al, Generating Massive High-Quality Random Numbers Using GPU, 2008, IEEE Congress on Evolutionary Computation (CEC 2008), pp. 841-847 2008.

* cited by examiner

*Primary Examiner* — Andrew Caldwell
*Assistant Examiner* — Calvin M Brien
(74) *Attorney, Agent, or Firm* — Ryan W. Dupuis; Kyle R. Satterthwaite; Ade & Company Inc.

(57) ABSTRACT

A true random number generator (TRNG) uses sources of uncertainty found within graphics processing units (GPUs) together with signal processing techniques, for example histogram equalization, to obtain maximum entropy.

17 Claims, 6 Drawing Sheets

```
1    __global__ void kernel(int* dMem, int
         MAX_ITERATIONS)
2    {
3        int k = 0;
4        __shared__ int s[SIZE-1];
5        __shared__ int out[SIZE];
6
7        int id = threadIdx.x;
8        int temp[SIZE];
9        do {
10           s[id] = id;
11           out[id] = s[id+1];
12           temp[id] = out[id];
13           dMem[id] = temp[id];
14           k++;
15       } while(k<MAX_ITERATIONS);
16   }
```

TRUE RANDOM NUMBER GENERATOR USING GPU AND SIGNAL PROCESSING TECHNIQUES

This application is a national phase filing of PCT/CA2012/050069 and claims benefit under 35 U.S.C. 119(e) of U.S. Provisional Application Ser. No. 61/440,492, filed Feb. 8, 2011.

FIELD OF THE INVENTION

The present invention relates to a novel technique to implement a true random number generator (TRNG) using sources of uncertainty found within graphics processing units (GPUs) together with signal processing techniques, for example histogram equalization, to obtain maximum entropy.

BACKGROUND

Pseudo Random Number Generators (PRNGs) are widely used in a variety of applications such as encryption, simulation, gaming, art and communications to name just a few examples. In some cases the quality of random numbers is of paramount importance. Under such conditions, it is not advisable to use PRNGs. For such special cases, another class of random number generators called True Random Number Generators (TRNGs) is frequently used.

The most commonly used random number generators are the PRNGs. A PRNG uses a deterministic system and an initial seed to reproduce the output sequence. Most common PRNGs are classified as congruential generators, feedback shift register generators, generators based on cellular automata and generators based on chaotic systems, etc. Shannon's entropy of the output depends on the entropy of the seed and the entropy of the output can never exceed the entropy of the initial seed. PRNGs reproducibility is a great asset for simulation; meanwhile entropy dependency and the seed selection become a great challenge for exploiting its parallelism and scalability.

TRNGs on the other hand are based on a non-deterministic source such as radio noise, radioactive decay, thermal noise generated from a semiconductor diode, thermal flow, etc. Complex and slow methods have been implemented before based on user interaction or hardware events such as capturing keystrokes, the mouse movement, the hard drive seek times, system activity, and configuration or delays.

Overall, TRNGs have various advantages over PRNGs. First, the unpredictability of TRNGs offers better randomness. Second, a TRNG lacks periodicity or data dependencies, making it the best option for meeting the stringent requirement for communication and encryption. Although TRNGs have many advantages over PRNGs, PRNGs are very popular due to their flexibility, low cost and sometimes its generation time. In fact, one of the main reasons why PRNGs are preferred over TRNGs is the implementation cost, which for some TRNGs cases involves a huge initial investment.

True Random Number Generator Classification

The randomness of a TRNG output depends on a non-deterministic source and its corresponding deterministic post processing step. In some cases the source of randomness does not produce random numbers according to the needs of the user. For this reason, the post-processing stage is used to modify the generated random numbers according to a specified distribution.

TRNGs can be subdivided into three phases. The first phase generates digitized analog signal (DAS) random numbers, which are obtained from sources like random microcosmic processes (i.e. the semiconductor thermal noise or the shot noise of a Zener diode), and periodic digitization of the time-continuous analog signal from the source. The second phase generates the internal random numbers; which represent the DAS random numbers after being post-processed to reduce its distribution weakness. The third phase is called external random numbers, and it corresponds to the final result of the algorithm for extracting the random number. This approach has been adopted since 2001 by the German IT security certification authority (BSI) in its AIS 31 publication. In general, a good post-processing algorithm guarantees higher entropy than the entropy of the source, as long as the source is probed to be independent.

Another way to generate random numbers is by combining several independent sources. The randomness and independence of these cumulative sources depends directly on the number of combined sources, however, some statistical defects might still be present, which can be alleviated by the post-processing phase. This allows the flexibility of verifying the entropy directly after the post-processing phase, leaving an open window to design any post-processing algorithm.

The Need of True Random Number Generators

It is well known that PRNGs fit most of the application needs, however, sometimes the generated numbers lack strong statistical properties. There are demanding situations where PRNGs are substituted by TRNGs, such as generating cryptographic keys, generating lists of lottery winner tickets, or stochastic simulations. In these situations, the use of PRNGs can become unreliable since its sequence becomes predictable due to its geometrical properties.

Use of True Random Number Generators

Extensive research has been done on PRNGs, a good survey can be found in D. Knuth, The Art of Computer Programming, Addison-Wesley Publishing Company, 1998. Research for TRNGs has been concentrated on the development of better physical noise sources. TRNGs can be found in low-cost semiconductors using digital design techniques that fit reconfigurable devices (i.e. FPGAs, CPLDs, and microcontrollers). Multiple designs based on different sources of randomness and different techniques to generate the internal random numbers had been proposed in Berk Sunar, William J. Martin, Douglas R. Stinson, A Provably Secure True Random Number Generator with Built-In Tolerance to Active Attacks, IEEE Transactions on Computers, pp: 109-119, January 2007. For instance, some of them use the combination of analog and digital designs to generate and process white noise, some other apply a simple architecture of stable states by recombining a large number of circuits.

Most of the existing approaches for parallelizing the random number generation are based on PRNGs, by either batches or using texture memories found in GPUs architectures. New approaches had been explored by NVidia based on CUDA (Compute Unified Device Architecture). In a recent study, it was established that GPUs are highly efficient in parallel PRNGs when compared to CPUs. However, all these approaches are based on the use of a PRNG. To the best of our knowledge, the use of GPUs for TRNGs has not been documented before.

SUMMARY OF THE INVENTION

According to one aspect of the invention there is provided a method of generating random numbers comprising:

providing a general purpose computation device having a primary function other than random number generation;

identifying at least one non-deterministic characteristic of the general purpose computation device;

extracting random number data from said at least one non-deterministic characteristic; and performing a post processing function on the extracted random number data.

Nowadays, the use of General Purpose GPUs (GPGPUs) in high performance computing applications is becoming a very popular new field of applied research of high performance computing applications. GPUs have been shown to be very effective in data parallel problems. The present invention provides an opportunity to develop a TRNG that generates high quality random numbers in a scalable and economical design.

Preferably the general purpose computation device comprises a general purpose processing unit and said at least one non-deterministic characteristic comprises a characteristic of the processing unit.

Preferably the general purpose computation device comprises an embedded system and said at least one non-deterministic characteristic comprises a characteristic of the embedded system.

Preferably the general purpose computation device comprises a graphics processing unit and said at least one non-deterministic characteristic comprises a characteristic of the graphics processing unit.

The non-deterministic characteristic may comprise one or both of two independent characteristics which are:

a measurement of an elapsed time of a group of possible race conditions; and a completion time for sampling and processing a temperature value of a core temperature of the processor.

When the processor comprises a graphics processing unit including a thermal control interface and an application programming interface, preferably the temperature value is extracted by the application programming interface from the thermal control interface.

The post processing function may include performing data compression on the extracted random data according to the following function:

$$f_{RC}(n) = 10^n t_{RC} \bmod (1.0)$$

where $t_{RC}$ is the elapsed time of the group of possible race conditions and the first n decimal places are removed and the value is considered from that point to the right.

The post processing function may include performing data compression on the extracted random data according to the following function:

$$f_{TC}(n) = 10^n t_{TC} \bmod (1.0)$$

where $t_{TC}$ is the completion time for sampling and processing the temperature value and the first n decimal places are removed and the value is considered from that point to the right.

Preferably the method includes performing the post processing function on the extracted random number data such that statistical properties of the extracted random number data are improved using a statistical matching and normalization technique arranged for uniformly distributing gray level values in image processing.

According to a further aspect of the present invention there is provided a method of generating random numbers comprising:

obtaining random number data from a source; and performing a post processing function on the random number data using a statistical matching and normalization technique arranged for uniformly distributing gray level values in image processing.

A transformation function is preferably used to linearize a cumulative distribution function of the random number data along the value range.

The method preferably includes interpolating values within limits of a selected bin associated with the data and changing the value to be uniformly distributed along the bin when the same value is present in the bin.

The statistical matching and normalization technique may be selected from the group including histogram equalization and exact histogram equalization.

The exact histogram equalization preferably includes:

ordering elements in the data according to $x_1 < x_2 < \ldots < x_N$;

splitting the ordered sequence according to L groups that contain h elements each; and assigning a value to each group by interpolating values within limits of a bin associated with the data and changing the value to be uniformly distributed along the bin when the same value is present in the bin.

According to a further aspect of the present invention there is provided a method of generating random numbers comprising:

providing a source having at least one non-deterministic characteristic; extracting random number data from said at least one non-deterministic characteristic of the source; and performing a post processing function on the extracted random number data.

The source preferably comprises a primary function other than random number generation.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figures 1, 2:
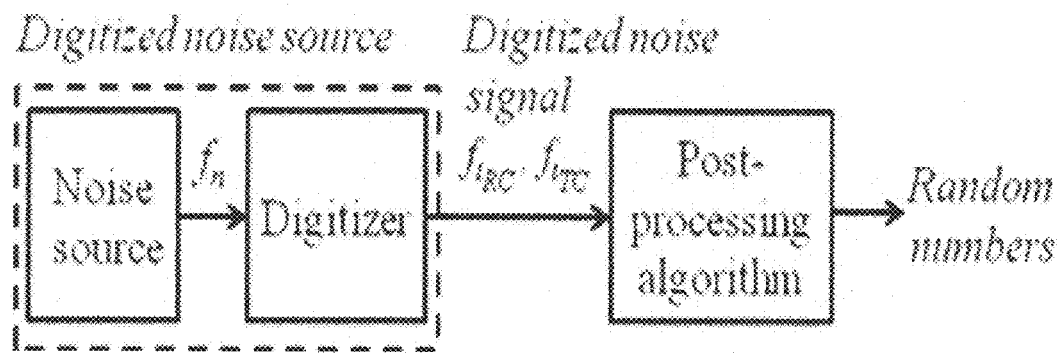
FIG. 1 is a schematic representation of a random number generator.
FIG. 2 is a representation of the ANSI C code that provokes a race condition.

The present invention relates to a low-cost, effective and novel technique for designing a TRNG using sources of uncertainty in a GPU. For experiments, a NVidia GeForce 9400M graphic card was used. It was also demonstrated that the present invention offers fast execution times and can be easily implemented on parallel architectures. The quality of the random number generator was tested by using statistical tests on the two proposed sources of uncertainties: i) threads race conditions and ii) GPU core temperature.

Because of the more frequent use of GPUs in today's computational systems, the present invention highlights the benefits of implementing a parallel and completely independent TRNG based on the GPU architecture. An easy and effective way to generate TRNGs is provided herein without compromising the importance of PRNGs.

As described further below, the random numbers generated by the present invention have been evaluated using four tests. First, we measure the correlation values between two sequences of random numbers, second, we measure the entropy values, third, we use watermarking, an application used in network security and finally we use Monte Carlo analysis for pi-value calculation. Based on these quality measurements, our method has achieved better results than popular random number generators compared in this work. Furthermore, this approach is a massively scalable solution ideal for high performance computing implementations.

As suggested by M. Hocko and T. Kalibera, (Reducing performance non-determinism via cache-aware page allocation strategies, In Proceedings of the First Joint WOSP/SIPEW international Conference on Performance Engineering, San Jose, Calif., USA. Jan. 28-30, 2010, pages 223-234), sources of randomness can be found in most computational devices in the following three classifications: (1) sources originating in the hardware, like core temperature, (2) sources originating from PRNG like a linear congruential RNG and (3) sources originating from very complex deterministic processes like page allocators, or system schedulers or race conditions.

Therefore, GPU programs are not the exception to non-deterministic behavior during race conditions, in which an unknown behavior is observed from multiple unsynchronized threads writing and reading from the same memory location [4]. During a race condition as mentioned in M. Boyer, K. Skadron, W. Weimer, Automated dynamic analysis of CUDA programs, In Third Workshop on Software-Tools for MultiCore Systems, 2008, a source of randomness can be obtained; thus, the measurement of the elapsed time of a group of possible race conditions can be a feasible and indirect measurement of this source of randomness.

Another non-deterministic behavior present in all semiconductors is the core temperature change. It was observed that the temperature extracted from the NVIDIA Application Programming Interface (NV-API) using the GPU thermal control interface follows a non-deterministic behavior in the elapsed time of its calculation. One limitation is the accuracy cut-off of the decimal part, which shows a true random behavior. Additionally, race conditions and thermal flow are also well known sources of randomness. Nevertheless, to the best of our knowledge, the use of the above mentioned random sources to extract true random numbers from GPUs has not been considered before. Our focus is then on these sources of randomness to generate true random numbers.

We analyzed two cases: i) the time measurement of a group of race conditions, and ii) the measurement of the time taken to sample the core temperature. These options appear inside the Digitized noise source in the general block diagram of the proposed random number generator in FIG. 1.

The Measurement of Race Condition Times

CUDA was designed by NVidia in 2006 to unify two different groups of processors and to optimize the power consumption; CUDA contains an intelligent thread scheduler module, which assigns the load to threads in a round robin fashion. This programming model, called SIMT (Single Instruction Multiple Threads), executes the same instruction on all threads created for that process. However the scheduler is oblivious to the order in which the threads will finish their tasks. Even without this information, the scheduler is able to predict and avoid race conditions for memory access beforehand by manipulating the order of instructions and introducing context switching among threads. In our case, an interesting phenomenon was observed using the code described in FIG. 2, in particular, when the number of threads is 32n+1, the case of 129 threads or the variable SIZE=129.

Taking advantage of the speed of shared memory and its supported coherency model, two vectors were defined in lines 4 and 5, where the vector size s is lower than the out vector; with the purpose of introducing an unknown value X that will be propagated depending on the order that threads 127, 128 and 129 finish.

In lines 10 and 11, the assignment to s[id] is not synchronized with the following reading instruction for s[id+1] and its storage in out[id]; in this case there will be occasions where out[id] will be id+1, but this is not guaranteed, and the value is unknown, since it is still being written or is about to be written by the thread id+1.

The Measurement of Time to Sample the Core Temperature

In the GeForce family line of products, the NVidia core is provided with a diode as a built-in temperature measurement device. It is well known that diode thermometers are used in temperature measurements due to their low cost, stability of nearly ±0.8 C for a range from −55 C to 150 C, linearity, simple circuitry and good sensitivity.

As the temperature changes in the diode, the forward voltage across the p-n junction changes linearly. This voltage is digitized and stored in a register, which indirectly represents the core temperature. The time for retrieving the register by a call from the NV-API behaves like a non-deterministic process. In other core diode thermometers used in the GeForce family, the registers access follows a round-robin selection method such as in the ADT7473 diode. Therefore, it can be identified that the measurement of the completion time for extracting the temperature value is the source of randomness.

Figure 3:
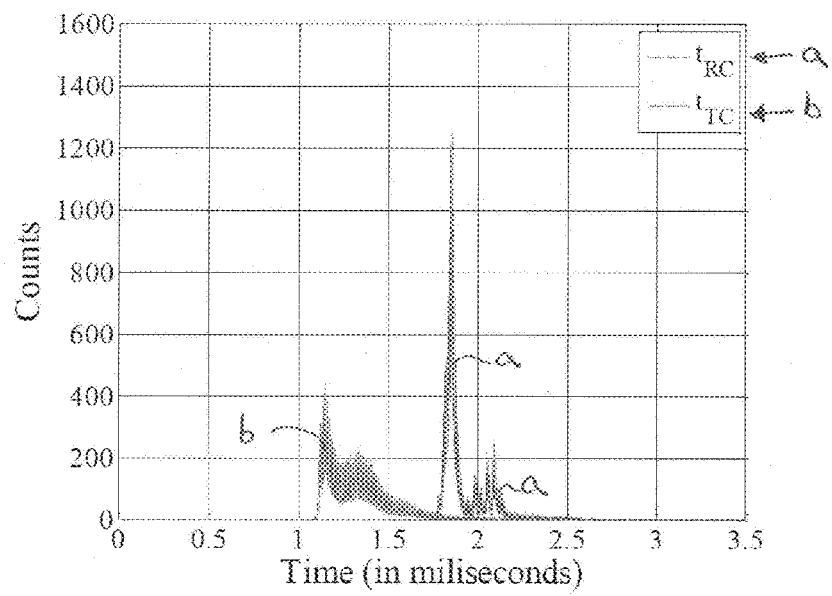
FIG. 3 is a histogram of the proposed sources of randomness for $10^6$ samples, with a $5.0 \times 10^{-5}$ bin size in which the measurement of time of race conditions is $t_{RC}$ and the measurement of time to sample the core temperature is $t_{TC}$.

By doing a simple inspection of the histograms of both suggested sources of randomness shown in FIG. 3, no particular shape associated to a common probability distribution function is evident. It can be noted also that the numbers are concentrated within a small specific range; thus a post-processing stage is needed if random samples are needed that are distributed as a more common distribution such as the standard uniform.

Figure 4:
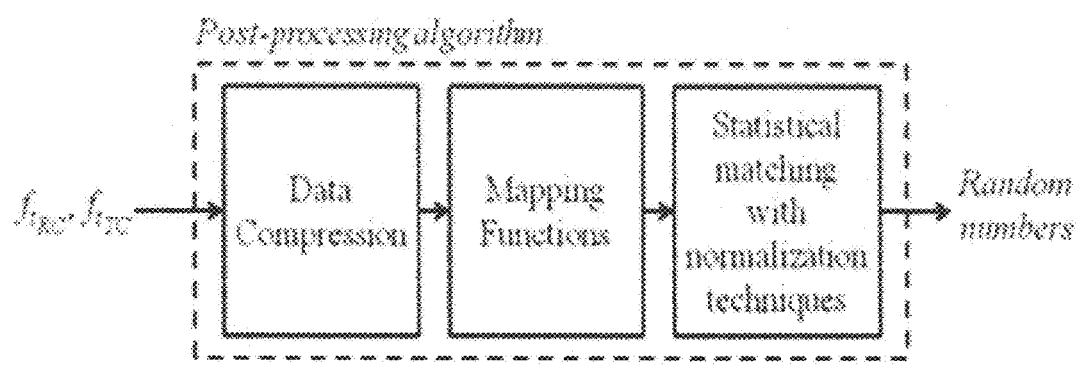
FIG. 4 is schematic representation of the subdivisions of the post-processing algorithm.

For a better understanding of the post-processing stage, this stage is subdivided into three sections: data compression, mapping functions and statistical matching with normalization techniques. These sections are illustrated in FIG. 4. In the statistical matching stage, two very well known image processing techniques, histogram equalization and exact histogram equalization, will be used to modify the random samples in such a way to obtain random samples with a uniform distribution. This, in fact leads to maximum entropy as it will be explained in subsequent sections.

The Post-Processing Algorithm

The first stage of the post-processing algorithm is the data compression, meaning that information will be encoded in smaller representation units. There are tradeoffs by applying data compression, for example, how the statistical weaknesses are masked and transformed into others, meanwhile the entropy increases. In this sense, the stage is implemented with the following equations, $$f_{RC}(n)=10^n t_{RC} \bmod(1.0) \tag{1}$$

$$f_{TC}(n)=10^n t_{TC} \bmod(1.0) \tag{2}$$

where the first n decimal places are removed and the value is considered from that point to the right, $t_{RC}$ represents the sequence of random numbers obtained from the race condition source and $t_{TC}$ from the temperature source. The modulus operation has a range on [0, 1.0].

For the second stage, seven basic mapping functions were arbitrarily selected with the purpose of measuring their impact after the third stage. This includes addition, subtraction, multiplication, exponentiation and modulus of two signals. The evaluated functions were:

$$f_0 = f_{RC} \tag{3}$$

$$f_1 = f_{TC} \tag{4}$$

$$f_2 = [(f_{RC} + f_{TC}) \bmod(1.0) \tag{5}$$

$$f_3 = f_{RC} f_{TC} \tag{6}$$

$$f_4 = (f_{RC} - f_{TC} + 1) \bmod(1.0) \tag{7}$$

$$f_5 = (f_{TC} - f_{RC} + 1) \bmod(1.0) \tag{8}$$

$$f_6 = f_{RC}^{f_{TC}} \tag{9}$$

The third stage is the statistical matching with normalization techniques, where histogram equalization and exact histogram equalization were used in order to obtain uniform distributed random numbers which at the same time offer maximum entropy.

Histogram Equalization and Exact Histogram Equalization

Histogram equalization (HE) is a technique used in image processing that enhances the contrast of an image by guaranteeing a final image with a distribution of gray level values that resembles the uniform distribution as described in R. C. Gonzalez, R. E. Woods, Digital Image Processing, 2nd Edition, Prentice Hall, 2002. HE is based on the following mathematical observations:

Given a discrete random variable, X, with the probability mass function (p.m.f.) or histogram, $$p_X(x) = P(X=x) : R \to [0,1] \tag{10}$$

the cumulative distribution function (c.d.f.) or the accumulated normalized histogram is, $$F(x) = P(X \le x) = \sum_{x_2 \le x} p_X(x_i) \tag{11}$$

The HE technique suggests using a transformation function in the form of $$Y = F(x) \tag{12}$$

where the transformation function will linearize the c.d.f. of x along the value range, and then Y is supposed to have a uniform distribution. A slight modification is proposed since the distribution inside the bins needs to be preserved and not replaced by an integer value. The modification then consists on interpolating the value within the limits of the bin and in the only case where the same value is present in the bin; this value is changed and uniformly distributed along the bin.

Although HE can be considered as one of the most popular approaches among the image enhancement techniques, it can show spikes and gaps in the final uniform histogram. The second technique that will be evaluated then is Exact Histogram Equalization (EHE) that yields a final histogram that is completely flat without having the undesired effects mentioned above. Exact Histogram Equalization is described in D. Coltuc, P. Bolon, J. M. Chassery, Exact histogram specification, IEEE Transaction on Image Processing, 15(5), pages 1143-1152, May 2006. The necessary steps to achieve these complete uniform histograms are:

1) Ordering the elements in the dataset such that, $$x_1 < x_2 < \ldots < x_N \tag{13}$$

2) The ordered sequence is split in L groups that contain h elements each.

3) A value is assigned to each group. Specifically in this step, a similar interpolation as in HE is introduced in order to preserve the source distribution within the bin. The scheme of EHE yields the exact results, since the dataset is transformed exactly into the desired distribution by fixing the bin elements count.

The Evaluation Criteria

The evaluation is divided into four stages. The first stage evaluates the independence of the das random numbers and the post processing establishes that if the internal random numbers are independent from the noise source, then the entropy can be evaluated after the post processing without compromising the statistical properties. The Pearson product-moment correlation coefficient was used to measure the independence of the two random variables:

$$p_{X,Y} = \frac{E[(X - \mu_X)(Y - \mu_Y)]}{\sigma_X \sigma_Y} \tag{14}$$

where E denotes the expected value, $\mu_x$, $\mu_y$ the respective averages and $\sigma_x$, $\sigma_y$ denotes the variances. For independent variables, a correlation value nearer to 0 is expected. Otherwise, as it becomes near to ±1, the relationship proves to be linear.

The second evaluation stage is based on measurements of the normalized entropy, H, as proposed in A. Kaufmann, Introduction to the theory of fuzzy subsets, New York, Academic Pr vol. 1, 1975:

$$H = -\frac{1}{\log(k)} \sum_{j=1}^{k} f_x(j) \log f_x(j) \tag{15}$$

where k is the total number of bins. By using Equation 15, different techniques can be evaluated under the same basis within the range [0, 1], in which the higher value in Equation 15 indicates that the random numbers generated are more uniformly distributed. For this evaluation stage, the normalized entropy of seven proposed functions was compared against the normalized entropy of a common PRNG, the Mersenne Twister.

Figure 5:
FIG. 5 is a standard version of a representative 512×512 grey-scale image.
Figure 6:
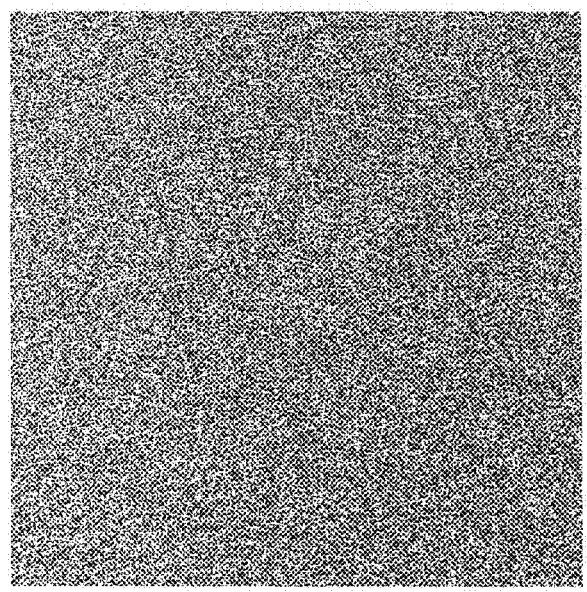
FIG. 6 is a random image using equation 6 and EHE.

The third stage consists of a proof of concept via an actual application of the random numbers generated by the proposed approach. The evaluation considers two methods for digital image watermarking: i) Least Significant Bit (LSB) modification as described in R. G. van Schyndel, A. Z. Tirkel, N. R. A. Mee and C. F. Osborne, A Digital Watermark, First IEEE Image Processing Conference, Houston, Tex., November 1994, vol II, pages 86-90, and ii) Discrete Cosine Transform (DCT) modification as described in C. Chan, T. Chen, and H. Hsia, An Image Watermarking Scheme Using Pattern Coding Technique, In Proceedings of the First international Conference on innovative Computing, information and Control—Volume 3 (Aug. 30-Sep. 1, 2006), ICICIC, IEEE Computer Society, Washington, D.C., pages 467-470. In this stage, for the case of LSB, the image in FIG. 5 was encoded with an image containing random numbers as the watermark, shown in FIG. 6. For the DCT case, a 64 byte key (random numbers) was encoded as the watermark in the image shown in FIG. 5. In the next step the encoded image was exposed to Gaussian noise ($\mu$=0, $\sigma^2$=0.01) and salt and pepper noise (density=0.05). Finally, the encoded image was decoded to retrieve the watermark.

Once decoded, the Peak Signal to Noise Ratio (PSNR) was selected as a quality metric that shows how visible and robust the watermark is. In consequence, the higher the PNSR value the better invisibility, implying a closer resemblance between the reconstructed and the original watermark.

Consider $I_0$ as the original watermark for an 8-bit greyscale image of size mn or a 64 byte key. $I_e$ will represent the reconstructed watermarked image or the reconstructed 64 byte key, meanwhile the Mean Squared Error (MSE) is defined as:

$$MSE = \frac{1}{mn}\sum_{i=0}^{m-1}\sum_{j=0}^{n-1}[I_0(i,j) - I_e(i,j)]^2 \quad (16)$$

$$PSNR = 10\log_{10}\left(\frac{(2^8-1)^2}{MSE}\right) \quad (17)$$

In our case, a minimum of 38 dB is expected for a decent invisibility. This was also compared to the evaluation of an image or a key of random numbers from the Mersenne Twister PRNG.

The fourth evaluation stage consists of another very well known application that uses random numbers: the approximation of $\pi$ using the Monte Carlo method. Consider a pair of random variables $(X_i, Y_i) \sim U_2(0,1)$, $i=1, \ldots n$ and $$P(X_i^2 + Y_i^2 < 1) = \frac{\pi}{4} \quad (18)$$

so the estimator for $\pi$ can be defined as:

$$z \cong 4\frac{\#\{(X_i, Y_i) : X_i^2 + Y_i^2 < 1\}}{n} \quad (19)$$

where # represents the cardinality of the set. Then an error estimator for z can be defined as $z_e$, from the subtraction from the decimal representation of $\pi$ truncated to 50 decimal places, $z_{50}$:

$$z_e = \left|\frac{z_{50} - z}{z_{50}}\right| \quad (20)$$

The approximation was evaluated for $10^2$, $10^4$ and $10^6$ iterations.

Results

Stage-1 Independence of Das Random Numbers and Post Processing Random Numbers.

Figure 7:
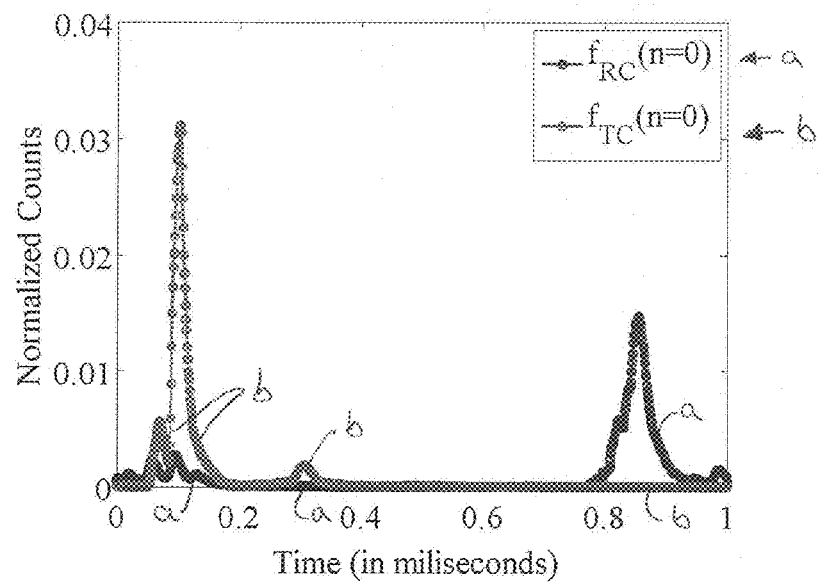
FIG. 7 is a graphic representation of data compression for n=0.
Figure 8:
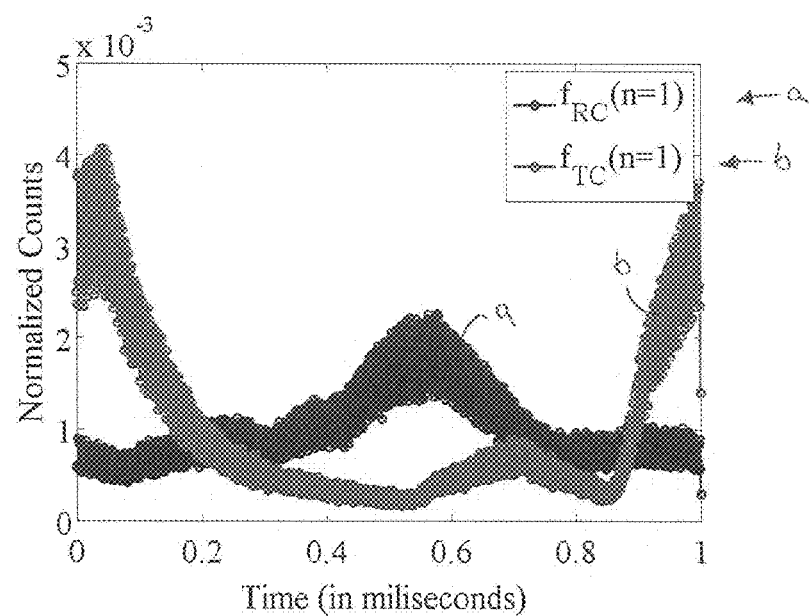
FIG. 8 is a graphic representation of data compression for n=1.
Figure 9:
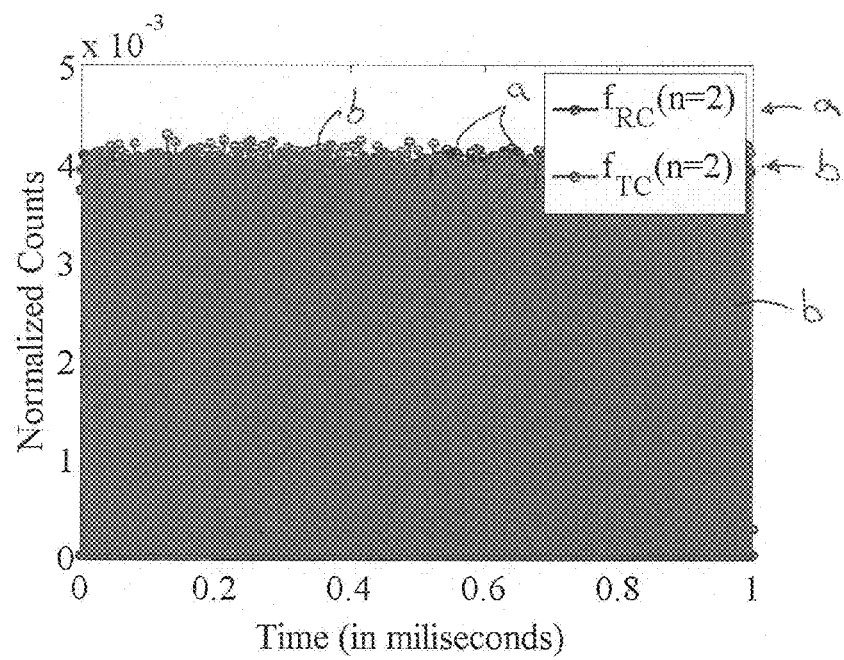
FIG. 9 is a graphic representation of data compression for n=2.
Figure 10:
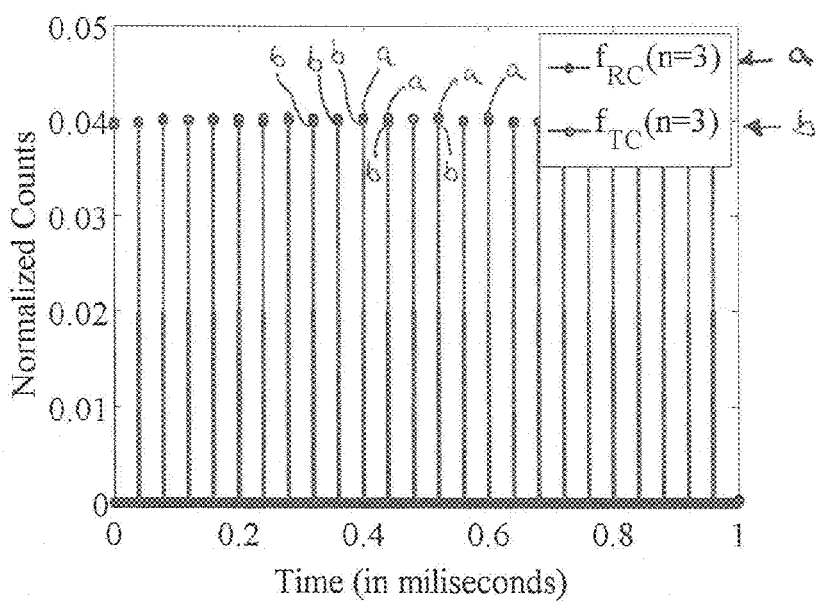
FIG. 10 is a graphic representation of data compression for n=3.
Figure 11:
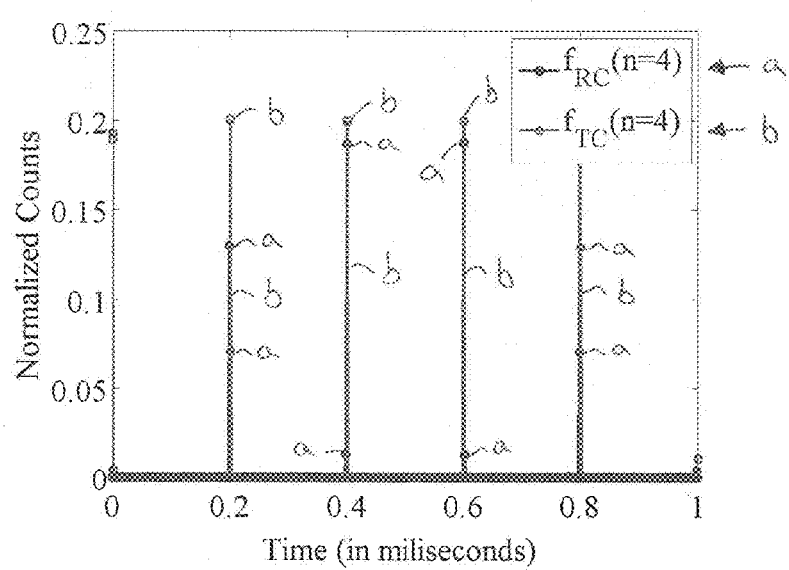
FIG. 11 is a graphic representation of data compression for n=4.
Figure 12:
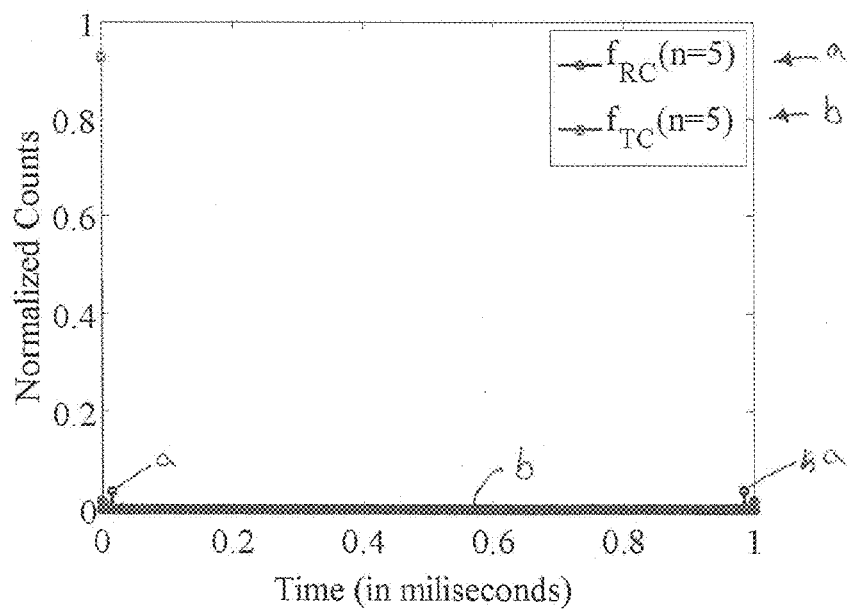
FIG. 12 is a graphic representation of data compression for n=5.

As it can be observed from Table 1, the independence of das random numbers and the first post processing stage was reliable for both random sources when the data compression was taken from $10^{-1}$, or n=1. But independency becomes poor after the data was compressed for $10^{-4}$. This can be related to how the data concentrates in a similar uniform shape in FIGS. 8 to 11, while in FIGS. 7 and 12 a poor concentration on the centers can be observed. Hence the signals that yielded the histograms in FIGS. 7 and 12 were not considered for further investigation.

TABLE 1

Correlation results from the comparison of das random numbers and the first post processing stage

| n | $P_{tRCf0}$ | $P_{tTCf0}$ |
|---|---|---|
| 0 | −0.4542999000 | 0.4645102000 |
| 1 | 0.0422047600 | 0.0003828042 |
| 2 | −0.0015706590 | −0.0003443821 |
| 3 | 0.0002900318 | 0.0005655271 |
| 4 | 0.0150430400 | −0.0041530290 |
| 5 | 0.1875572000 | −0.1041387000 |

Stage-2 Normalized Entropy Results

Since it's only reliable to evaluate elements which are independent from the source, the evaluation of the proposed functions and the statistical matching with normalization techniques was focused in data compression results from $10^{-1}$ to $10^{-4}$ only. This can be observed in Table 6. Also it can be noticed how the Exact Histogram Equalization improves the entropy tremendously, so the highest value and a standard uniform distribution is achieved.

Stage-3 Proof of Concept Application: Digital Image Watermarking

Based on the previous testing stage results, only the random numbers obtained after the Exact Histogram Equalization was used as shown in Tables 2 through 5. It can be observed how the watermarking invisibility is better with the proposed TRNG key than when using the Mersenne Twister random number key. This result suggests that the use of the proposed TRNG can be applied for encryption of the watermarks even under noise attacks.

TABLE 2

PSNR (in dB) of the retrieved watermark using the LSB modification method under an attack of salt & pepper noise, d = 0.05.

| Function | N=1 | N=2 | N=3 | N=4 | MT |
|---|---|---|---|---|---|
| f0 | 57.1924 | 57.1914 | 57.1958 | 57.1946 | 57.1870 |
| f1 | 57.1924 | 57.1968 | 57.1906 | 57.1964 | |
| f2 | 57.1923 | 57.1954 | 57.1924 | 57.1965 | |
| f3 | 57.1927 | 57.1922 | 57.1921 | 57.1947 | |
| f4 | 57.1999 | 57.1965 | 57.1942 | 57.1905 | |
| f5 | 57.1891 | 57.1925 | 57.1947 | 57.1985 | |
| f6 | 57.1920 | 57.1907 | 57.1970 | 57.1954 | |

TABLE 3

PSNR (in dB) of the retrieved watermark using the LSB modification method under an attack of Gaussian white noise, $\mu = 0$, $\sigma^2 = 0.01$

| Function | N=1 | N=2 | N=3 | N=4 | MT |
|---|---|---|---|---|---|
| f0 | 57.1735 | 57.1797 | 57.1853 | 57.1880 | 57.1926 |
| f1 | 57.1965 | 57.1839 | 57.1893 | 57.2024 | |
| f2 | 57.1998 | 57.1711 | 57.1962 | 57.1847 | |
| f3 | 57.1811 | 57.1808 | 57.1818 | 57.1890 | |
| f4 | 57.1910 | 57.1860 | 57.1869 | 57.1998 | |
| f5 | 57.1906 | 57.1956 | 57.1958 | 57.1813 | |
| f6 | 57.1725 | 57.1835 | 57.1858 | 57.1836 | |

TABLE 4

PSNR (in dB) of the retrieved watermark using the DTC modification method with a keylength of 64, under an attack of salt & pepper noise, d = 0.05.

| Function | N=1 | N=2 | N=3 | N=4 | MT |
|---|---|---|---|---|---|
| f0 | 81.2441 | 81.2441 | 81.2441 | 84.2544 | 81.2441 |
| f1 | 84.2544 | 81.2441 | 84.2544 | 79.4832 | |
| f2 | 84.2544 | 81.2441 | 81.2441 | 81.2441 | |
| f3 | 81.2441 | 81.2441 | 81.2441 | 84.2544 | |
| f4 | 84.2544 | 81.2441 | 79.4832 | 84.2544 | |
| f5 | 81.2441 | 84.2544 | ∞ | 81.2441 | |
| f6 | 81.2441 | 79.4832 | 79.4832 | 84.2544 | |

TABLE 5

PSNR (in dB) of the retrieved watermark using the DTC modification method with a keylength of 64, under an attack of Gaussian white noise, $\mu = 0$, $\sigma^2 = 0.01$.

| Function | N=1 | N=2 | N=3 | N=4 | MT |
|---|---|---|---|---|---|
| f0 | 72.7931 | 73.4626 | 72.2132 | 72.7931 | 72.2132 |
| f1 | 72.2132 | 73.1150 | 72.7931 | 73.1150 | |
| f2 | 72.4935 | 71.9499 | 72.4935 | 72.7931 | |
| f3 | 72.4935 | 73.4626 | 72.4935 | 72.4935 | |
| f4 | 73.4626 | 73.1150 | 72.7931 | 72.4935 | |
| f5 | 72.4935 | 72.7931 | 73.1150 | 73.4626 | |
| f6 | 73.4626 | 74.2544 | 73.4626 | 72.2132 | |

Stage-4 Approximation Using the Monte Carlo Method.

The results for this section show how the pi approximation yields better results when using the proposed TRNG, as shown in Tables 7-9. Additionally, the number of iterations needed to achieve better performance is smaller. As it can be observed, the smaller error percentage occurs in $f_4$, n=3, for 10000 iterations.

TABLE 6

Normalized entropy results

| n | Function | Post-processing | HE | EHE | MT (1997) |
|---|---|---|---|---|---|
| 1 | f0 | 0.947127 | 0.985337 | 1.000000 | 0.999943 |
|   | f1 | 0.986136 | 0.996494 | 1.000000 | |
|   | f2 | 0.996751 | 0.997700 | 1.000000 | |
|   | f3 | 0.885556 | 0.999504 | 1.000000 | |
|   | f4 | 0.992520 | 0.996552 | 1.000000 | |
|   | f5 | 0.992525 | 0.996427 | 1.000000 | |
|   | f6 | 0.950560 | 0.998269 | 1.000000 | |
| 2 | f0 | 0.869890 | 0.799358 | 1.000000 | |
|   | f1 | 0.882504 | 0.803270 | 1.000000 | |
|   | f2 | 0.899476 | 0.802619 | 1.000000 | |
|   | f3 | 0.935126 | 0.996804 | 1.000000 | |
|   | f4 | 0.899480 | 0.802717 | 1.000000 | |
|   | f5 | 0.899480 | 0.802056 | 1.000000 | |
|   | f6 | 0.963481 | 0.997909 | 1.000000 | |
| 3 | f0 | 0.545030 | 0.500046 | 1.000000 | |
|   | f1 | 0.546762 | 0.571412 | 1.000000 | |
|   | f2 | 0.566206 | 0.670942 | 1.000000 | |
|   | f3 | 0.763576 | 0.754090 | 1.000000 | |
|   | f4 | 0.566211 | 0.668187 | 1.000000 | |
|   | f5 | 0.566203 | 0.671355 | 1.000000 | |
|   | f6 | 0.832229 | 0.865148 | 1.000000 | |
| 4 | f0 | 0.313277 | 0.369723 | 1.000000 | |
|   | f1 | 0.316906 | 0.325093 | 1.000000 | |
|   | f2 | 0.344759 | 0.620820 | 1.000000 | |
|   | f3 | 0.371963 | 0.511505 | 1.000000 | |
|   | f4 | 0.344850 | 0.620594 | 1.000000 | |
|   | f5 | 0.344846 | 0.1620217 | 1.000000 | |
|   | f6 | 0.440119 | 0.519349 | 1.000000 | |

TABLE 7

Error estimator of $\pi$ approximation using Monte Carlo method for $10^2$ iterations

| F | N=1 | N=2 | N=3 | N=4 | MT |
|---|---|---|---|---|---|
| f0 | 0.019606 | 0.044056 | 0.018592 | 0.032338 | 0.031324 |
| f1 | 0.005859 | 0.057803 | 0.019606 | 0.006873 | |
| f2 | 0.005859 | 0.044056 | 0.006873 | 0.057803 | |
| f3 | 0.019606 | 0.044056 | 0.006873 | 0.056789 | |
| f4 | 0.032338 | 0.018592 | 0.044056 | 0.005859 | |
| f5 | 0.019606 | 0.006873 | 0.019606 | 0.019606 | |
| f6 | 0.005859 | 0.044056 | 0.057803 | 0.04507 | |

TABLE 8

Error estimator of $\pi$ approximation using Monte Carlo method for $10^4$ iterations

| F | N=1 | N=2 | N=3 | N=4 | MT |
|---|---|---|---|---|---|
| f0 | 0.011461 | 0.001016 | 0.000639 | 0.001908 | 0.004963 |
| f1 | 0.00013 | 0.003058 | 0.003949 | 0.002294 | |
| f2 | 0.00726 | 0.005095 | 0.003313 | 0.001398 | |
| f3 | 0.002167 | 0.001526 | 0.002294 | 0.001653 | |
| f4 | 0.007005 | 0.003181 | 2.34E−06 | 0.003313 | |
| f5 | 0.004841 | 0.001785 | 0.003185 | 0.00013 | |
| f6 | 0.005605 | 0.002544 | 0.005218 | 0.000507 | |

TABLE 9

Error estimator of π approximation
using Monte Carlo method for $10^6$ iterations

| F | N=1 | N=2 | N=3 | N=4 | MT |
|---|---|---|---|---|---|
| f0 | 0.009558 | 0.000207 | 0.000479 | 0.000557 | 0.000463 |
| f1 | 0.000171 | 7.02E−05 | 0.000493 | 0.000319 | |
| f2 | 2.19E−05 | 5.88E−05 | 0.000752 | 0.000582 | |
| f3 | 0.004513 | 0.000261 | 0.000449 | 0.000443 | |
| f4 | 0.000671 | 5.71E−05 | 9.91E−05 | 3.42E−05 | |
| f5 | 0.000118 | 7.87E−05 | 0.000423 | 0.000186 | |
| f6 | 0.006835 | 0.000499 | 0.000198 | 9.32E−05 | |

CONCLUSION

A novel technique for extracting and post processing random numbers using the GPU architecture has been presented, showing the advantage of implementing a TRNG on GPUs as a scalable and inexpensive solution. A roadmap for analysis has also been discussed showing the benefits of applying data compression followed by exact histogram equalization to improve the statistical deficiencies of the TRNG. In this sense, the TRNG was shown to have an excellent performance in security and privacy applications, as well as in stochastic simulations, leaving open for future research its optimization and the analysis of other noise sources in GPUs.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of generating random numbers comprising:
 using a general purpose computation device to execute a primary function other than random number generation;
 extracting random number data from the general purpose computation device by extraction of number data from a measurement of a physical phenomena of the general purpose computation device comprising at least one of i) an elapsed time of a group of possible race conditions from the use of the general purpose computation device to execute the primary function other than random number generation and ii) a completion time for sampling and processing a temperature value of a core temperature of the general purpose computation device from the use of the general purpose computation device to execute the primary function other than random number generation; and
 performing a post processing function on the extracted random number data to produce the random numbers.

2. The method according to claim 1 wherein the general purpose computation device comprises a general purpose processing unit.

3. The method according to claim 1 wherein the general purpose computation device comprises an embedded system.

4. The method according to claim 1 wherein the general purpose computation device comprises a graphics processing unit.

5. The method according to claim 1 wherein the physical phenomena of the general purpose computation device comprises the elapsed time of the group of possible race conditions from the use of the general purpose computation device to execute the primary function other than random number generation.

6. The method according to claim 1 wherein the measurement of the physical phenomena of the general purpose computation device comprises the completion time for sampling and processing the temperature value of the core temperature of the general purpose computation device from the use of the general purpose computation device to execute the primary function other than random number generation.

7. The method according to claim 6 wherein said general purpose computation device comprises a graphics processing unit including a thermal control interface and an application programming interface and wherein the temperature value is extracted by the application programming interface from the thermal control interface.

8. The method according to claim 1 wherein the physical phenomena of the general purpose computation device comprises both:
 the elapsed time of the group of possible race conditions; and
 the completion time for sampling and processing the temperature value of the core temperature of the general purpose computation device.

9. The method according to claim 8 wherein the post processing function includes performing data compression on the extracted random number data according to the following function:

$$f_{RC}(n) = 10^n t_{RC} \bmod (1.0)$$

where $t_{RC}$ is the elapsed time of the group of possible race conditions and the first n decimal places are removed and the value is considered from that point to the right.

10. The method according to claim 8 wherein the post processing function includes performing data compression on the extracted random number data according to the following function:

$$f_{TC}(n) = 10^n t_{TC} \bmod (1.0)$$

where $t_{TC}$ is the completion time for sampling and processing the temperature value and the first n decimal places are removed and the value is considered from that point to the right.

11. The method according to claim 1 including performing the post processing function on the extracted random number data such that statistical properties of the extracted random number data are improved using a statistical matching and normalization technique arranged for uniformly distributing gray level values.

12. The method according to claim 11 including using a transformation function to linearize a cumulative distribution function of the random number data along the value range.

13. The method according to claim 12 including selecting a bin associated with the data, interpolating values within limits of the bin and changing the interpolated value to be uniformly distributed along the bin when the same value is present in the bin.

14. The method according to claim 11 wherein the statistical matching and normalization technique is either histogram equalization or exact histogram equalization.

15. The method according to claim 11 wherein the statistical matching and normalization technique comprises histogram equalization.

16. The method according to claim 11 wherein the statistical matching and normalization technique comprises exact histogram equalization.

17. The method according to claim 16 wherein the exact histogram equalization includes:
ordering elements in the data according to $x_1 < x_2 < \ldots < x_N$;
splitting the ordered sequence according to L groups that contain h elements each; and
assigning a value to each group by interpolating values within limits of a bin associated with the data and changing the value to be uniformly distributed along the bin when the same value is present in the bin.

\* \* \* \* \*